US008594041B2

(12) United States Patent
Mecca

(10) Patent No.: US 8,594,041 B2
(45) Date of Patent: *Nov. 26, 2013

(54) INHIBITING SYSTEM TRAFFIC FROM UNREGISTERED MOBILE STATIONS

(75) Inventor: Paul J. Mecca, Manalapan, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 1389 days.

This patent is subject to a terminal disclaimer.

(21) Appl. No.: 11/680,252

(22) Filed: Feb. 28, 2007

(65) Prior Publication Data

US 2007/0147353 A1    Jun. 28, 2007

Related U.S. Application Data

(63) Continuation of application No. 10/953,668, filed on Sep. 29, 2004, now Pat. No. 7,215,944.

(51) Int. Cl.
*H04W 4/00* (2009.01)

(52) U.S. Cl.
USPC ........... 370/331; 370/352; 455/410; 455/411; 455/435.1; 455/435.2; 455/435.3

(58) Field of Classification Search
USPC ............... 370/352, 331; 455/410, 411, 435.1, 455/435.2, 435.3
See application file for complete search history.

(56) References Cited

U.S. PATENT DOCUMENTS

| | | | |
|---|---|---|---|
| 5,978,670 A | 11/1999 | Casoli et al. | |
| 6,816,908 B1 * | 11/2004 | Usmani | 709/229 |
| 6,990,085 B1 | 1/2006 | Matsuura | |
| 2003/0119506 A1 | 6/2003 | Singhai | |
| 2004/0139028 A1 | 7/2004 | Fishman et al. | |
| 2005/0113089 A1 | 5/2005 | Bamburak | |
| 2011/0264622 A1 * | 10/2011 | Vargas et al. | 707/618 |

* cited by examiner

*Primary Examiner* — Justin Lee
(74) *Attorney, Agent, or Firm* — Turocy & Watson, LLP

(57) ABSTRACT

A method and system for reducing transmissions from unregistered mobile wireless devices including inhibiting administrative type transmissions from the mobile wireless device upon detection that the mobile wireless device is in a first transmission mode indicating that the mobile wireless device is deactivated or unregistered. Moreover, the administrative type transmission functionality is automatically restorable. Transmissions from the mobile wireless device are preferably comprised of traffic transmissions that contain data packets and other transmissions that contain information for administrative purposes, such as for communication link management operations between the mobile wireless device and the wireless packet switched network. Preferably, the administrative type transmissions include roam transmissions, activation transmissions, and born transmissions.

20 Claims, 3 Drawing Sheets

INHIBITING SYSTEM TRAFFIC FROM UNREGISTERED MOBILE STATIONS

CROSS REFERENCE TO RELATED APPLICATION

This application is a continuation of U.S. patent application Ser. No. 10/953,668, filed Sep. 29, 2004, co-pending, which is hereby incorporated herein by reference in its entirety.

TECHNICAL FIELD OF THE INVENTION

The invention relates generally to telecommunications and, more particularly, to a method and system for inhibiting transmissions from unregistered mobile stations.

BACKGROUND OF THE INVENTION

Wireless communication systems providing mobile telephone service and other services have come into general use worldwide. The Internet and other data services have popularized the idea of wireless packet switched networks where instead of using a dedicated connection between the source and destination to move information, like a conventional cellular voice connection uses, a wireless packet switched network moves chunks or "packets" of information, via a network of switches, to and from mobile stations.

As with the cellular telephone networks, overall system integrity and security is an important aspect of a packet switch network. As required by the FCC (Federal Communication Commission), each mobile station in service in the wireless packet switched network contains an electronic serial number (ESN). The ESN is a 32-bit binary number that uniquely identifies a mobile station and is not supposed to be altered. When the wireless packet switched network receives certain communications from a mobile station, its ESN is validated (i.e., matched with the number registered with the network) before the mobile station is allowed access to user services.

Conventionally, whenever the mobile station attempts to communicate with the network with some control packets, the ESN is examined by the network to validate the mobile station for use on the network and, if the ESN cannot be validated, the network sends a deactivation communication over the air interface to the mobile station. The mobile station includes an application that is cooperable with a deactivation communication to temporarily render the mobile station unable to send packets containing user data over the air interface, essentially deactivating the mobile station from user services on the network. This type of deactivation communication from the network base station is known in the industry as a "DIE" packet.

Although the DIE functionality restricts user data packets, it does not restrict administrative type packets that provide network-level status information and control capabilities, for example. Some administrative type packets from the mobile station will trigger the ESN validation processing. The following list includes some scenarios in which status and/or control type packets are used by a conventional mobile station:
  mobile station powers On and sends an ACTIVE packet;
  mobile station powers On and sends a BORN packet; and
  mobile station roams to a "better" base station and sends a ROAM packet.

An ACTIVE packet is generally known in the industry as a packet sent to activate network registration, a BORN packet is sent to activate network registration for the first time, and a ROAM packet is known in the industry as a packet informing the network that the mobile station has moved to another base station in the network.

In other words, even though a mobile station has been deactivated from sending user data packets needed for accessing network services, it can still create system traffic across the network from continued transmission of administrative packets (such as ACTIVE, BORN, and ROAM packets). For example, when roaming, the mobile station stays in contact through the conventional roaming capabilities of the wireless packet switched network. The mobile station monitors the radio signal strength from nearby base stations and determines if and when a transfer of communication control to another base station is necessary. When the mobile station determines that a roam is necessary, it sends a ROAM packet to the wireless packet switched network, which in turn attempts to validate the mobile station via an ESN check for every ROAM packet received. A mobile station can roam several hundred times per day causing thousands of system level signals. Thus, it should be apparent that even those mobile stations which are deactivated from network user services can cause a great deal of system traffic.

There are many reasons for having deactivated and/or unregistered mobile stations operating in the network. For example, many new cars are provided with mobile stations, which enable services such as geographic position service (GPS). These mobile stations are typically embedded in the vehicle such that they are unavailable to end user meddling and typically are hard-wired to receive power from the vehicle battery. They are immediately operational for transmitting. Before the mobile station can be activated to receive GPS services, the user must subscribe to the service. Until then, the mobile station is considered "unregistered". Although unregistered for receiving GPS services, the mobile stations are still operational for transmitting system level administrative traffic. Further, a user's mobile station may be remotely deactivated from current network services by a network operator because the user quit paying the required subscription fees, for example. Again, even though the mobile station has been deactivated from receiving network services, the mobile station can still transmit system level administrative traffic that triggers ESN validation.

The problem is exacerbated when large numbers of deactivated and/or unregistered mobile stations are roaming in the network creating superfluous system traffic, which reduces the available communication bandwidth for registered mobile stations. The vehicle-embedded mobile station is particularly problematic because it is unavailable to the end user and has a near limitless power source (e.g., car battery). In other words, one cannot count on the end user disconnecting and/or reactivating the mobile station, or count on the power source eventually dying.

One approach has been developed to remotely disable handheld mobile stations from transmitting any signals, however, this approach also requires a manual reset to re-activate transmission operations. Manual reset is not a problem for handheld mobile stations. However, this is not a practical approach for mobile stations that are not readily available to the end user. Therefore, a need exists for a method and system for reducing unwanted system traffic caused from deactivated and/or unregistered mobile stations while enabling an automatic type approach for restoring mobile station transmission operations.

SUMMARY OF THE INVENTION

Briefly described, in a first preferred form the present invention comprises a method and system for managing transmissions from a mobile wireless device in a wireless packet switched network. In accordance with the present invention, monitoring is performed for a first transmission mode indicating that the mobile wireless device has failed to be validated for use on the network, in readiness for inhibiting administrative type transmissions from the mobile wireless device. Administrative type transmissions from the mobile wireless device are inhibited, responsive to detection of the first transmission mode. Moreover, the administrative type transmission functionality is automatically restorable.

Preferably, transmissions from the mobile wireless device are comprised of traffic transmissions that contain data packets and other transmissions that contain information for administrative purposes. Preferably, the administrative type transmissions include roam transmissions, activation transmissions, and born transmissions.

In one preferred embodiment in which the mobile wireless device is associated with a motor vehicle, the motor vehicle ignition is monitored and the administrative type transmission functionality is restored responsive to sensing activation of the motor vehicle ignition, for example.

In another preferred embodiment, administrative type transmissions from the mobile wireless device are suspended for a time interval responsive to detection of the first transmission mode and the administrative type transmission functionality is restored following the time interval. The time interval can be varied depending on a period of time from detection of the first transmission mode.

In another preferred form, the present invention comprises a first controller associated with the wireless packet switched network for validating use of a mobile wireless device on the wireless packet switched network. The first controller dispatches a notification signal to the mobile wireless device responsive to determining that the mobile wireless device is not valid for use on the network. The system also includes a second controller coupled with the mobile wireless device that is adapted to inhibit administrative type transmissions from the mobile wireless device responsive to detection of the first transmission mode, in which the administrative type transmission functionality is restorable automatically.

In a still further preferred form, the present invention comprises a computer program embodied on a computer-readable medium and having a first code segment for monitoring a first transmission mode indicating that the mobile wireless device is not valid for use in the wireless packet switched network and having a second code segment for activating a transmission inhibiting mode of operation for the mobile wireless device responsive to detection of the first transmission mode in which administrative type transmissions are inhibited upon detecting detection of the first transmission mode.

In another preferred form, the invention comprises an improvement in a method of operating a wireless communication network for communicating with a mobile device, with the network configured and operated to examine the ESN of the mobile station to validate the mobile station. The network is configured to stop the mobile station from accessing user services in the event that the ESN of the mobile station is invalid. This is accomplished by the network sending a DIE. The improvement comprises, in addition to stopping the mobile station from accessing user services, stopping the mobile station from administrative communications from the mobile station to the network until a time interval has passed or until a criterion has been satisfied, whereby wasteful system traffic is minimized.

DETAILED DESCRIPTION OF THE INVENTION

The present invention is directed to management of transmissions from a mobile wireless device in a wireless packet switched network. The present invention will be described with particular reference to the presently preferred exemplary embodiments. However, it should be understood that embodiments described herein are only a few examples of the many ways in which the present invention can be implemented.

Figure 1:
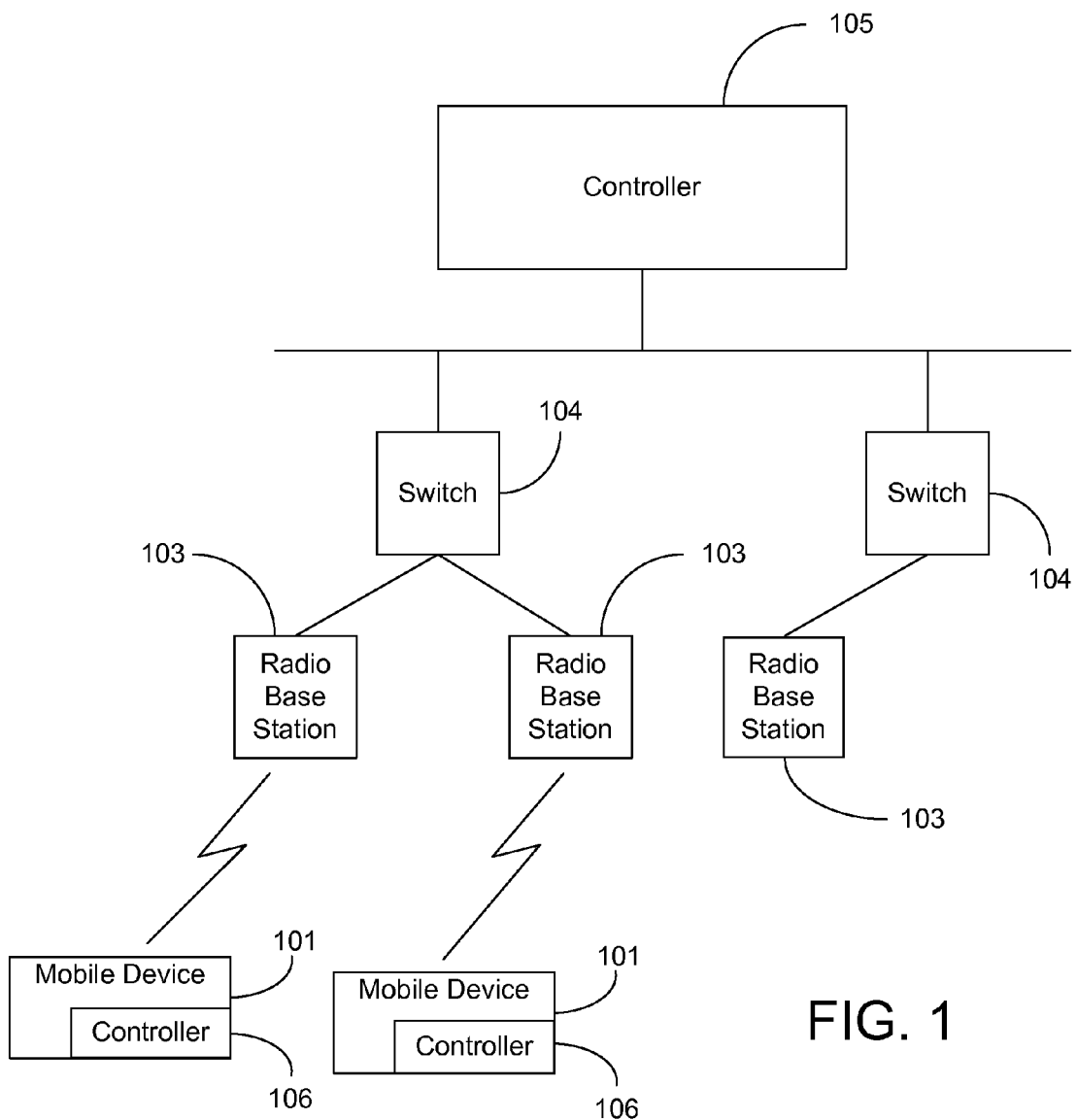
FIG. 1 is a schematic diagram illustrating a conventional wireless packet switched network.

Referring now to FIG. 1, there is shown a schematic diagram illustrating a simplified version of a conventional wireless packet switched network (WPSN). The WPSN includes a hierarchy of switches 104 and radio base stations 103 used to route packets to and from mobile units 101 over a radio link. The base stations 103 communicate with the mobile units 101 roamed into them and serve to route traffic in their coverage areas. Each mobile unit 101 has a controller 106 coupled thereto that is adapted to inhibit administrative type transmissions from the mobile unit. The base stations 103 further schedule the traffic on the radio paths so that the usage of the radio interface is as efficient as possible.

The base stations 103 are connected to switches 104, which can route traffic to other regions. Typically, there are many switches 104 organized in a hierarchy of regional and local switches connected by some type of transmission links. The switches 104 can provide connectivity between the mobile units 101 and fixed terminals and other networks. One such WPSN is the well-known Mobitex wireless packet switched network, which is an open, non-proprietary protocol system. Mobitex follows the Open System Interconnection (OSI) model, and supports wireless Internet Protocol (IP) connectivity.

The basic principle of the WPSN, and that of the Mobitex network, is that if a base station 103 or network node does not have knowledge of the intended addressee indicated in a "user packet", it will route the packet upwards until a node is reached where the intended addressee is known. The addresses are included in information packets known in the industry as user packets. The user packets also include data to be transferred to the included address. In the Mobitex network, the user packet is known as an MPAK, which is a formatted data packet that contains addresses, status bytes and user data. All user data exchanged within a Mobitex system is accomplished using MPAKs.

The WPSN is supervised and managed by a central controller 105, know in the Mobitex network as the network control center (NCC). The central controller 105 typically handles all operation and maintenance tasks, including subscriber administration and billing information. One particular operation/maintenance task is mobile unit registration. Typically, for registration, the electronic serial number (ESN) of a mobile unit (or similar type identification) is entered in a database associated with the central controller 105 and then becomes part of the subscription information that follows the mobile unit 101 throughout the WPSN. The ESN of a mobile unit 101 requesting network services is validated before the mobile unit 101 is allowed to access network services within the network. Additionally, the mobile unit is validated for every ACTIVE, ROAM and BORN sent to the network.

In operation, the mobile unit 101 sends its ESN to the WPSN in a transmission via the base station 103. The mobile unit 101 can include its ESN in many different types of transmissions, including administrative type transmissions. For example, the ESN typically is included in ACTIVE, BORN, and ROAM packets. After receiving the ESN, the base station 103 may attempt to validate the ESN and, if it cannot validation is transferred to the central controller 105.

The ESN is checked by matching the ESN in the subscription information with the ESN value received from the mobile unit 101. If the result of ESN checking is negative (if the data do not match), the mobile unit 101 is sent a disable signal (i.e., DIE signal). Upon receipt of the DIE signal, the mobile unit 101 is disabled from transmitting any user packets and reverts to the UNBORN state. Therefore, the mobile unit will send a BORN upon power up and ROAMING. If there is a match, the WPSN dispatches a signal with information enabling the mobile unit 101 to function normally on the network. The signal sent following a successful ESN check includes packets known in the industry as LIVE packets. LIVE packets disable any previous DIE orders and can be sent manually from the NCC.

As previously stated, a mobile unit 101 will be unable to transmit any user packets while in DIE mode, but will be permitted to send administrative type packets such as ACTIVE, BORN, and ROAM packets. Typically, the mobile unit will send a BORN instead of an ACTIVE or ROAM when in a DIE mode. Therefore, an invalid mobile unit 101 can be sent an infinite number of DIE signals due to constantly roaming, for example. This can cause excessive overhead on the radio channel, network infrastructure and central controller 105.

Figure 2:
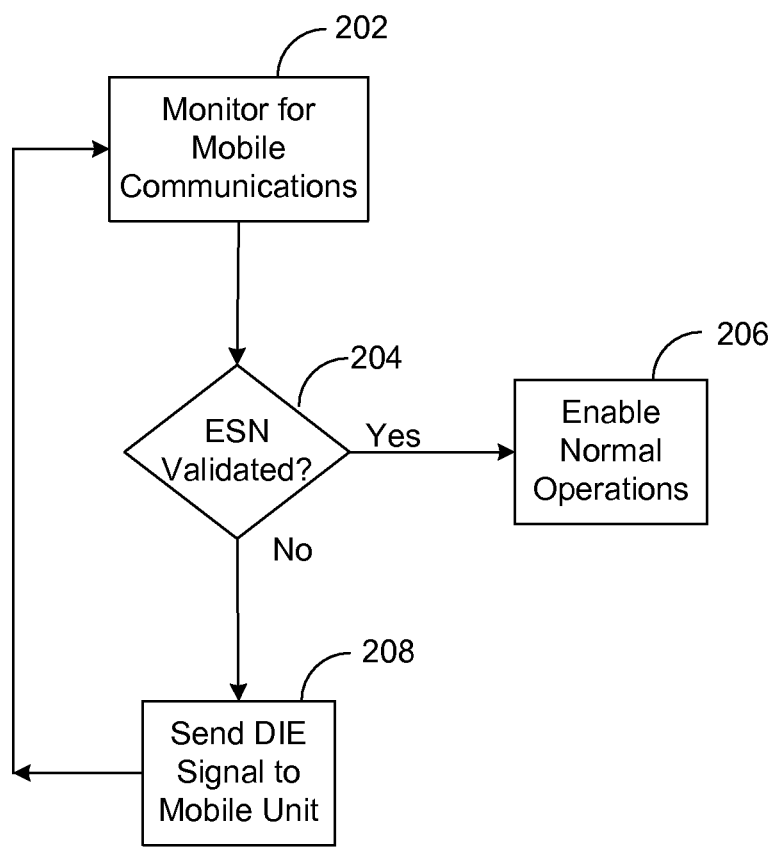
FIG. 2 is a schematic flow chart illustrating a conventional method for managing transmissions from a mobile device.

Referring now to FIG. 2, there is shown a schematic flow chart illustrating the above-described conventional method for managing transmissions from a mobile device. Firstly, the WPSN monitors for communications from a mobile unit (step 202). For each received communication, the ESN of the mobile unit for which a communication was received is validated (step 204). If the ESN is validated, the mobile unit is sent information including a LIVE packet enabling the mobile unit to function normally in the network (step 206). For an unsuccessful validation, the WPSN dispatches a signal (i.e., a DIE signal) to the mobile unit notifying it to suspend user packet transmissions (step 208). The mobile unit includes an application that is cooperable for disabling itself from transmitting user packets responsive to receiving a DIE signal.

Figure 3:
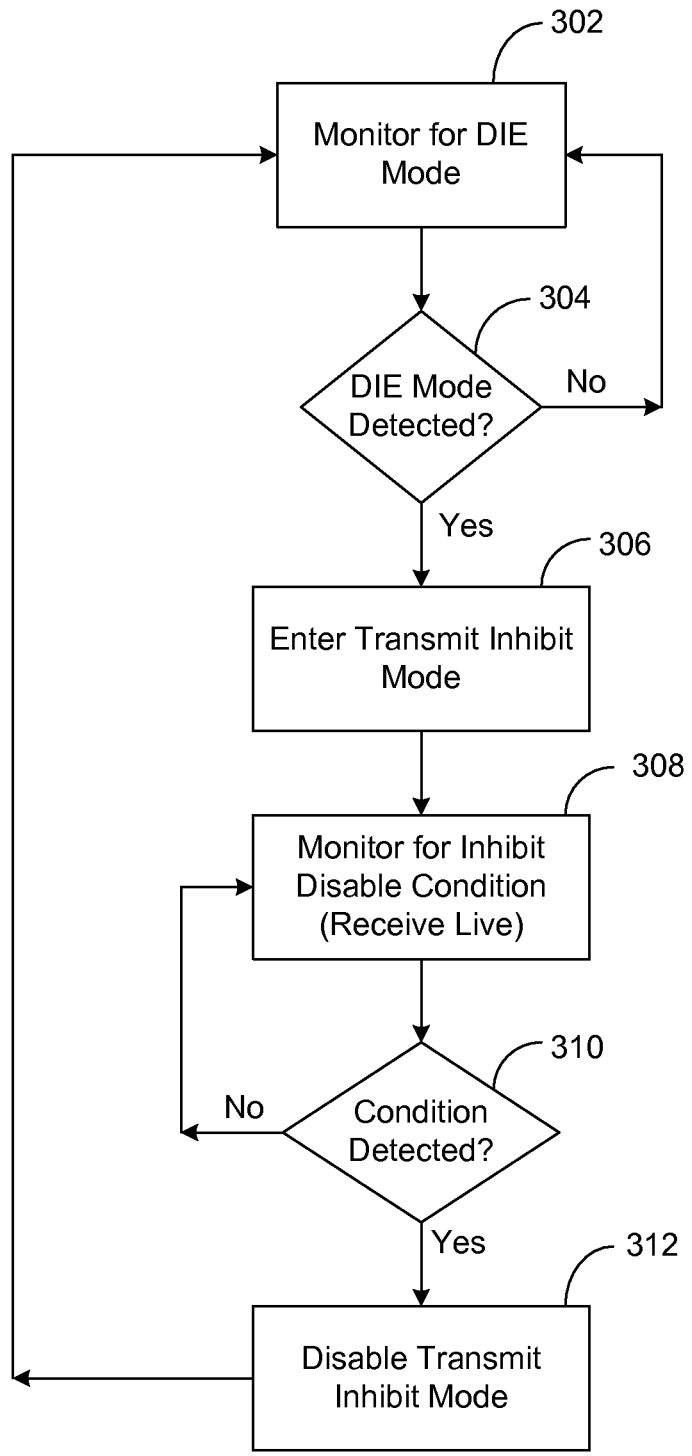
FIG. 3 is a schematic flow chart illustrating a method for managing transmissions from a mobile wireless device in accordance with exemplary embodiments of the present invention.

Referring now to FIG. 3, there is shown a schematic flow diagram illustrating a method according to the present invention for inhibiting deactivated/unregistered mobile units from transmitting administrative type packets. The presently described method can be embodied in an application layer or computer program associated with a mobile unit for use in a WPSN, such as that shown in FIG. 1 and described above. The presently described method can also be practiced in conjunction with the conventional management method shown in FIG. 2. Further, the computer program can be embodied in on a computer-readable medium.

Firstly, the method includes monitoring the mobile unit to determine if it is in a DIE mode (step 302). If a DIE mode is detected (indicating that the mobile is either deactivated, unregistered, or unauthorized), the controller coupled to the mobile unit is directed into a transmit inhibit mode (step 306) in which the mobile unit is disabled from transmitting all data packets, preferably including ACTIVE packets, ROAM packets, and BORN packets.

Once the mobile unit enters the transmit inhibit mode, monitoring begins for an inhibit mode disablement condition (step 308). If an inhibit mode disablement condition is detected (step 310), control is passed to disable the transmit inhibit mode (step 312). In other words, the mobile unit is restored to enable transmission of administrative type packets when a disablement condition is detected. Different types of disablement conditions, enabling automatic restoration of the administrative packet transmission functionality, are discussed below. Until an inhibit mode disablement condition is detected, control is returned to monitoring step 308. Subsequent to disabling the transmit inhibit mode, control is returned to monitoring step 302 for monitoring of the DIE mode.

Disablement conditions can include one of a period of time, activation of the vehicle ignition, or a combination thereof. For example, monitor step 308 can comprise monitoring for activation of the ignition of a vehicle in which a mobile unit is embedded. In this case, once the mobile unit enters a transmit inhibit mode following detection of a DIE mode, it will remain in the transmit inhibit mode until a user starts the vehicle. After the vehicle is started, the mobile unit is removed from the transmit inhibit mode state and once again is enabled to transmit administrative packets. If then the mobile unit transmits a BORN packet, for example, the WPSN will check the ESN and dispatch either a DIE packet or a LIVE packet. A DIE packet will result in the mobile unit returning to the transmit inhibit mode and a LIVE packet disables the DIE mode enabling normal operation.

In another example, monitor step 308 comprises monitoring for a period of time subsequent to detecting a DIE mode. In this case, once the mobile unit enters a transmit inhibit mode following detection of a DIE mode, it will remain in the transmit inhibit mode until a predetermined period of time has passed. Subsequently, the mobile unit is enabled to transmit a limited number of administrative packets. Preferably, the mobile unit is limited to transmitting BORN packets once per time period. If the mobile unit ESN is validated, resulting from a BORN packet, and the network returns a LIVE packet, the DIE mode and the transmit inhibit mode are disabled, then the mobile unit will operate normally.

The time period can be variable. In other words, the time period can be varied depending on the time from detection of the DIE mode. In one example, the time period can be twelve hours for the first two weeks following detection of the DIE mode, twenty-four hours during the weeks two through six following detection of the DIE mode, and forty-eight hours during weeks six through fifty-two following detection of the DIE mode. If the mobile unit remains in the DIE mode after fifty-two weeks, the mobile unit remains in the transmit inhibit mode until it is power cycled or manually reset. This schedule will produce no more than two hundred and seventeen BORN packets during a one-year period.

Of course, it should be understood that the order of the acts of the algorithms discussed herein may be accomplished in different order depending on the preferences of those skilled in the art. Also, while the principles of the present invention find ready application to WPSN networks, the invention can be applied in other environments, as suited. Furthermore, although the invention has been described with respect to particular embodiments, many variations and modifications will become apparent to those skilled in the art upon reading the present application. Such are within the spirit and scope of the invention as set forth in the following claims.

I claim:

1. A method of managing data transmission, the method comprising:

attempting, by a network device of a wireless packet switched network including a processor, to register a wireless mobile unit;

determining, by the network device, that the wireless mobile unit is unauthorized to use the wireless packet switched network;

reducing, by the network device, a data congestion of the wireless packet switched network by transmitting a DIE packet to the wireless mobile unit, the DIE packet including an instruction to disable a transmission of registration data from the wireless mobile unit to the wireless packet switched network; and automatically restoring, by the network device, reception of the registration data from the wireless mobile unit: after twelve hours during a first two weeks following a receipt of the DIE packet by the wireless mobile unit, or after twenty-four hours during week two through week six following the receipt of the DIE packet, or after forty-eight hours during week six through week fifty-two following the receipt of the DIE packet, or by a power cycle or manual reset of the wireless mobile unit when the wireless mobile unit remains in an idle mode more than fifty-two weeks following the receipt of the DIE packet.

2. The method of claim 1, wherein the automatically restoring includes restoring the reception of the registration data in response to a predetermined criterion being satisfied.

3. The method of claim 2, further comprising varying, by the network device, a time period in which the reception of the registration data is disabled based on a time of detecting a DIE mode for the wireless mobile unit, wherein the varying includes varying the time period for a first time period based on being within a first time from the detecting the DIE mode, varying the time period for a second time period based on being after a second time from the detecting the DIE mode, wherein the first time period occurs before the second time period, and the second time is after the first time.

4. The method of claim 2, wherein the predetermined criterion is a condition with respect to a fixed time interval.

5. The method of claim 2, wherein the wireless mobile unit is included as part of a motor vehicle, and the predetermined criterion is meeting a condition with respect to an ignition of the motor vehicle.

6. The method of claim 1, wherein the registration data comprises data related to network level status information.

7. The method of claim 5, further comprising detecting, by the network device, the receipt of the DIE packet by the wireless mobile unit.

8. The method of claim 7, further comprising restoring, by the network device, a transmission of administrative data to the wireless mobile unit.

9. The method of claim 7, further comprising receiving, by the network device, an electronic serial number that identifies the wireless mobile unit.

10. A wireless mobile unit, comprising:
a non-transitory memory that stores computer-executable instructions; and
a processor, communicatively coupled to the non-transitory memory, that facilitates execution of the computer-executable instructions to at least:
determine that the wireless mobile unit is unregistered during interaction of the wireless mobile unit with a wireless packet switched network;
receive a DIE packet that disables a transmission of registration data from the wireless mobile unit, to reduce data congestion on the wireless packet switched network; and
automatically restore the transmission of the registration data from the wireless mobile unit: after twelve hours during a first two weeks following reception of the DIE packet by the wireless mobile unit, or after twenty-four hours during week two through week six following the reception of the DIE packet, or after forty-eight hours during week six through week fifty-two following the reception of the DIE packet, or by a power cycle or manual reset of the wireless mobile unit when the wireless mobile unit remains in an idle mode more than fifty-two weeks following the reception of the DIE packet.

11. The wireless mobile unit of claim 10, wherein the registration data includes administrative data.

12. The wireless mobile unit of claim 10, wherein the transmission of the registration data from the wireless mobile unit to the wireless packet switched network is restorable in response to satisfaction of at least one predetermined criterion.

13. The wireless mobile unit of claim 12, wherein the processor is embedded in a motor vehicle.

14. The wireless mobile unit of claim 13, wherein the transmission of the registration data from the wireless mobile unit to the wireless packet switched network is restorable in response to a determination that a motor of the motor vehicle has started.

15. The wireless mobile unit of claim 12, wherein the processor further facilitates the execution of an application for disablement of the wireless mobile unit.

16. The wireless mobile unit of claim 12, wherein the processor further facilitates the initiation of a transmission mode that indicates the wireless mobile unit has failed to be validated.

17. The wireless mobile unit of claim 12, wherein the at least one predetermined criterion is based on a variable time period.

18. The wireless mobile unit of claim 12, wherein the at least one predetermined criterion is manual reset of the wireless mobile unit.

19. The wireless mobile unit of claim 12, wherein the wireless mobile unit is determined to be unregistered based on an electronic serial number.

20. A non-transitory computer-readable storage medium comprising computer-executable instructions that, in response to execution, cause a system including a processor to perform operations, comprising:
determining that a wireless mobile unit is unauthorized while interacting with a wireless packet switched network;
in response to the determining that the wireless mobile unit is unauthorized, facilitating reducing of data congestion of the wireless packet switched network including facilitating inhibiting transmission of data from the wireless mobile unit;
varying a time period in which the transmission of the data is inhibited based on a time of detecting a disabling signal for the wireless mobile unit, and
automatically restoring receiving of the data from the wireless mobile unit: after twelve hours during a first two weeks following a receipt of the DIE packet by the wireless mobile unit, or after twenty-four hours during week two through week six following the receipt of the DIE packet, or after forty-eight hours during week six through week fifty-two following the receipt of the DIE packet, or by a power cycle or manual reset of the wireless mobile unit when the wireless mobile unit remains in an idle mode more than fifty-two weeks following the receipt of the DIE packet.

* * * * *